Oct. 1, 1929.  T. R. AKIN ET AL  1,729,696
ROLLING MILL
Filed Nov. 25, 1927  4 Sheets-Sheet 1
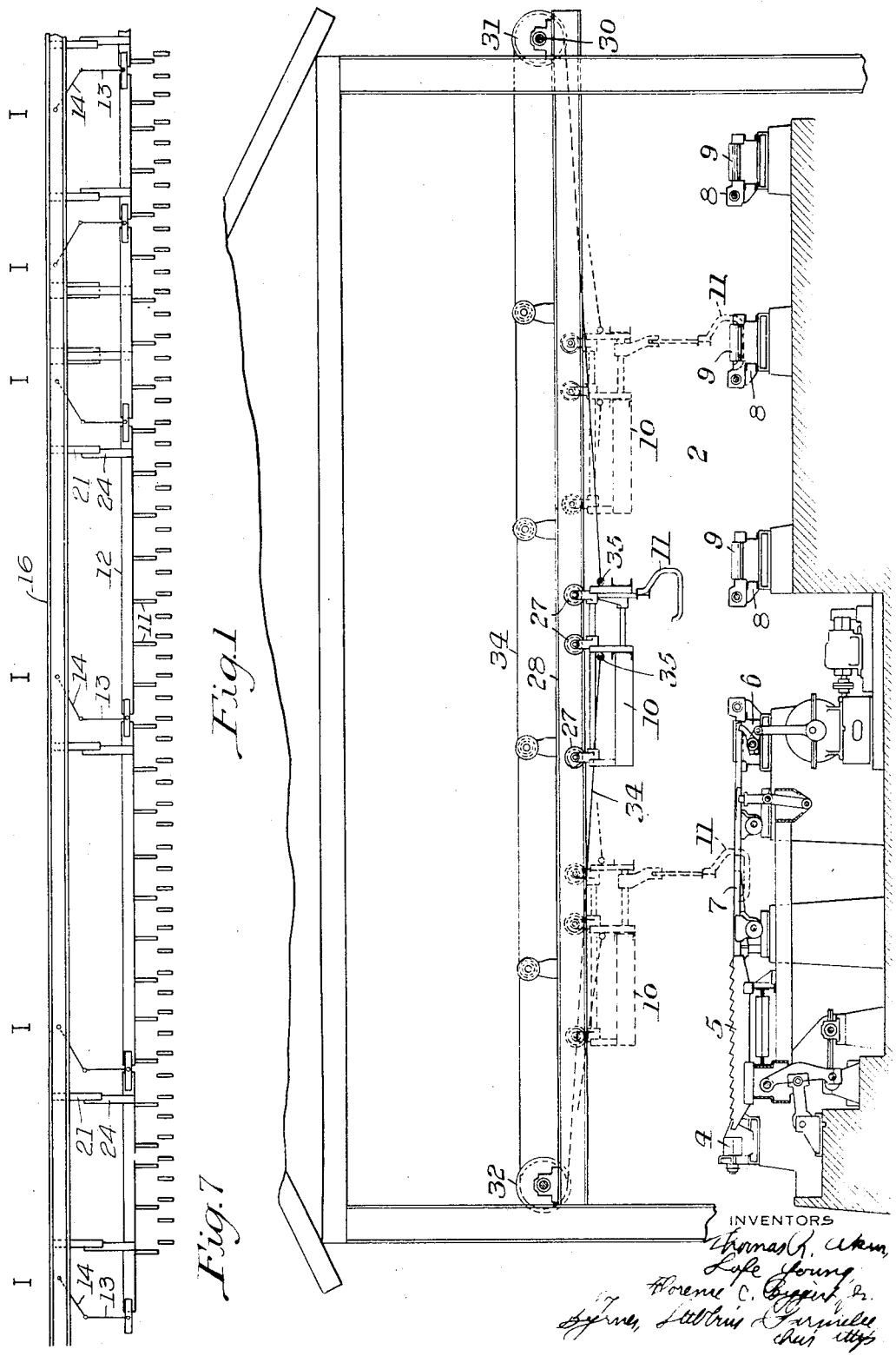

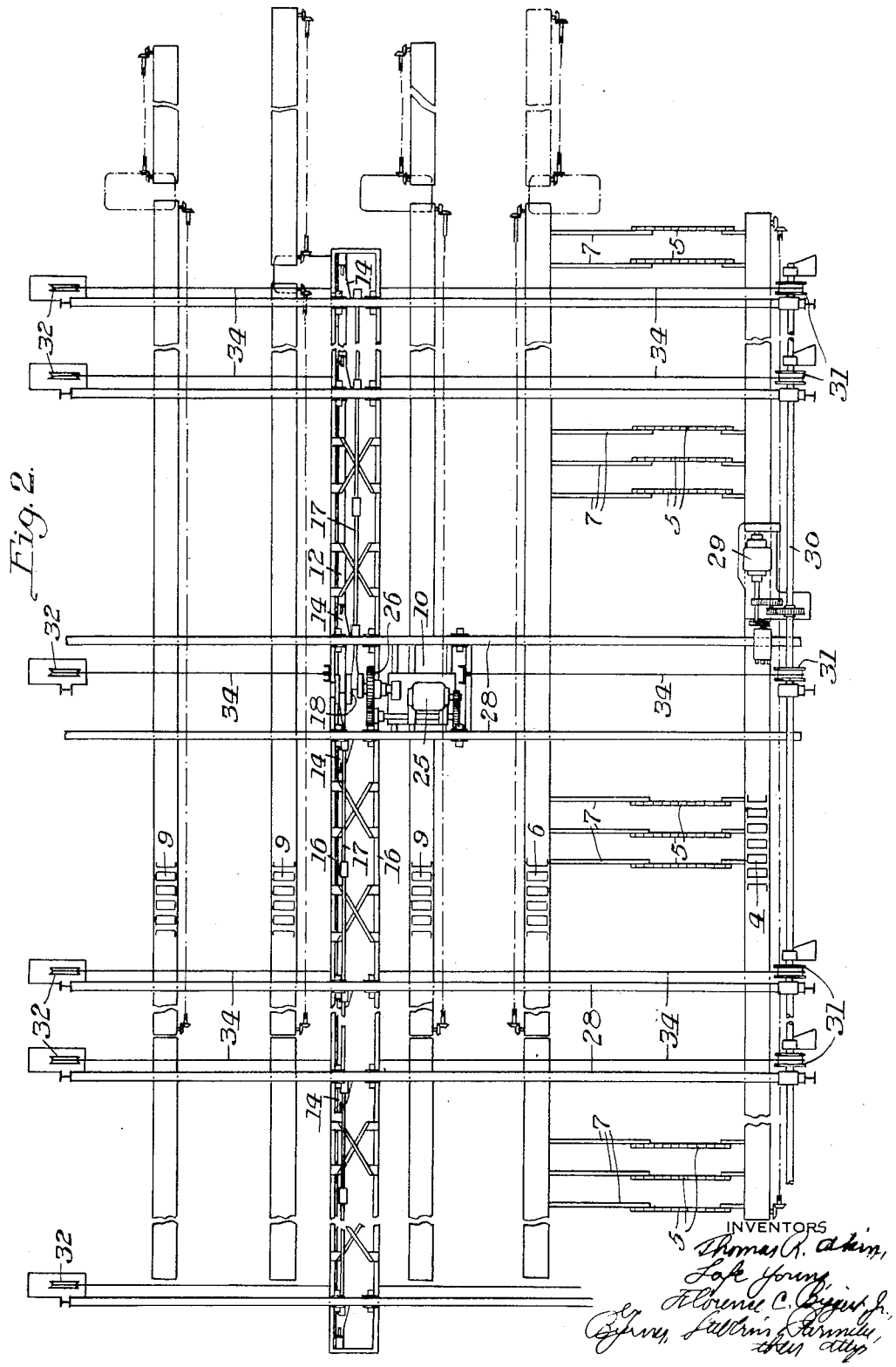

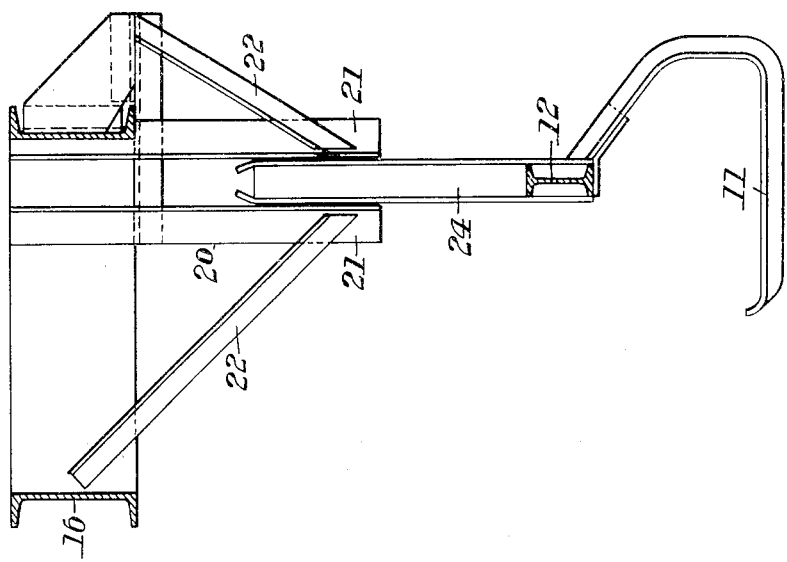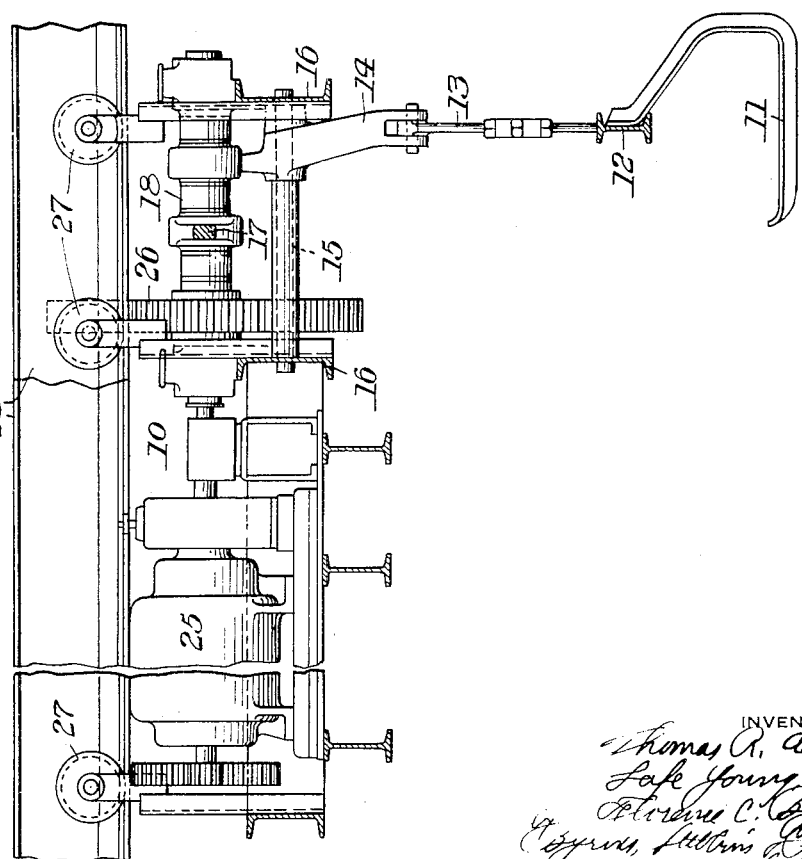

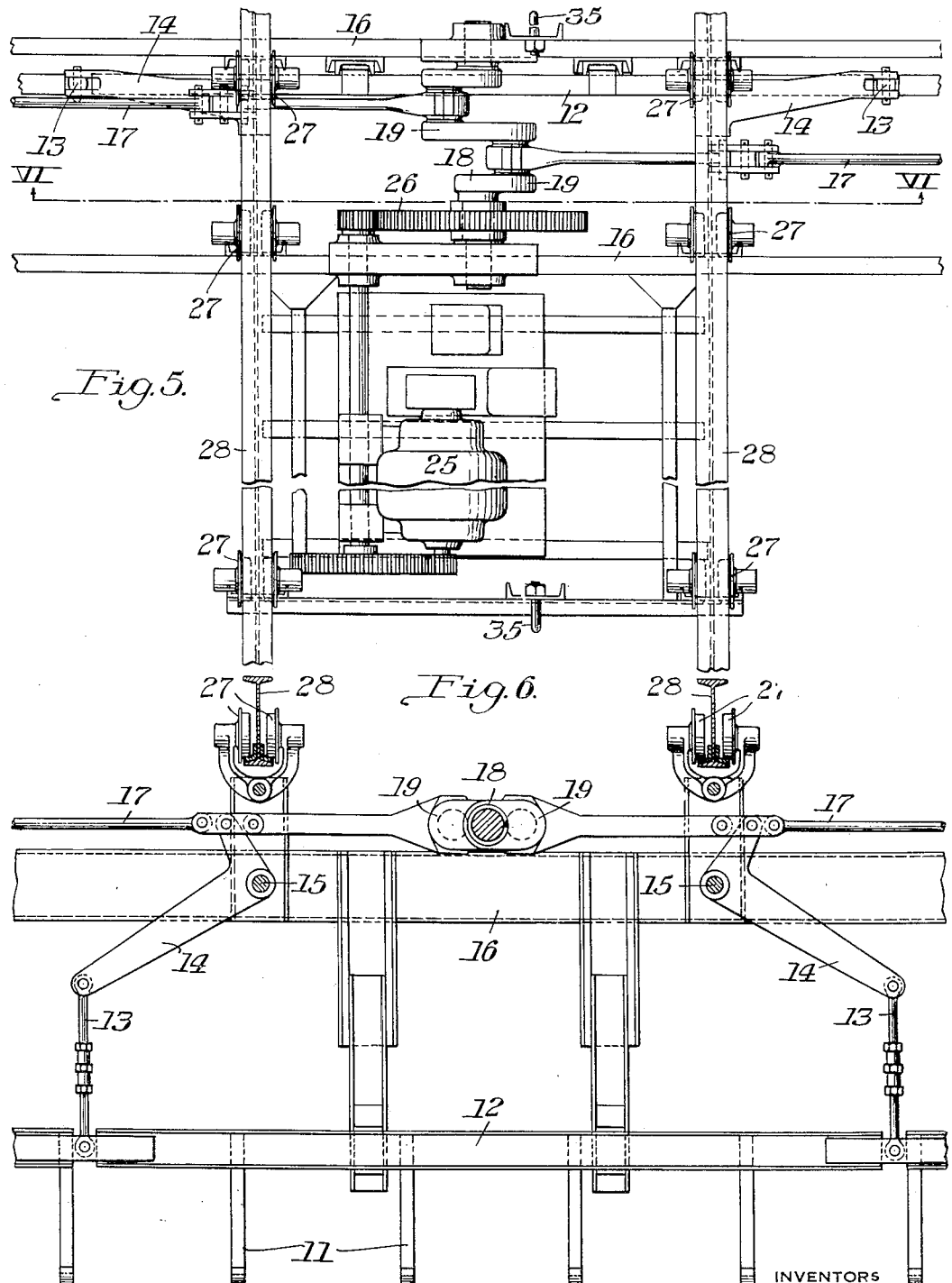

Patented Oct. 1, 1929

1,729,696

UNITED STATES PATENT OFFICE

THOMAS R. AKIN, OF ST. LOUIS, MISSOURI, LAFE YOUNG, OF ALTON, ILLINOIS, AND FLORENCE C. BIGGERT, JR., OF CRAFTON, PENNSYLVANIA, ASSIGNORS TO UNITED ENGINEERING & FOUNDRY COMPANY, OF PITTSBURGH, PENNSYLVANIA, A CORPORATION OF PENNSYLVANIA

ROLLING MILL

Application filed November 25, 1927. Serial No. 235,478.

Our invention relates to rolling mills, and particularly to an arrangement of transfer mechanism and metal working machinery for conveying material delivered from mill rolls and operating upon the same.

In the operation of rolling mills connected by transfer mechanism with metal working machinery, it occasionally happens that the output from the rolls exceeds the capacity of the connected machine. In such cases it has heretofore been necessary to reduce the speed of, or entirely stop, the rolls until the machinery has operated upon the accumulated material.

One example of such a condition is the operation of a roll-off table connected by a broadside transfer mechanism to metal working machinery such, for example, as shears. If the material is run onto the transfer mechanism faster than it is received by the metal working machinery, the accumulation of material fills the transfer mechanism and it is necessary to slow down or stop the rolls until the metal working machinery shall have exhausted the supply of material on the hotbed. Under such conditions the efficiency of the mill is reduced by reason of the idling of the rolls and transfer mechanism during the period that the metal working machinery is exhausting the accumulated material.

One object of our invention is to increase the capacity of a rolling mill and broadside transfer mechanism connected to the metal working machine by removing excess material accumulated on the transfer mechanism to an auxiliary metal working machine. For effecting such a transfer of excess material we provide a conveying device that is adapted to receive the material from the transfer mechanism without interrupting its operation, and to transfer the material to auxiliary machines spaced from and independent of the broadside transfer mechanism. One form of conveying mechanism may be an overhead crane provided with means for removing the material from the broadside transfer mechanism and delivering it to the auxiliary machines. The conveying of the excess material is accomplished at will and without interruption to either the transfer mechanism, the main metal working machine, or the auxiliary machines.

In the accompanying drawings there is shown, for the purposes of illustration only, a preferred embodiment of the present invention, it being understood that the drawings do not define the limits of our invention, as changes may be made in the construction and arrangement disclosed herein without departing either from the spirit of our invention or the scope of our broader claims.

In the drawings,—

Figure 1 is a diagrammatical end view of a mill embodying our invention;

Figure 2 is a plan view thereof, the roof being removed;

Figure 3 is an end view of the crane mechanism;

Figure 4 is an enlarged view of the guiding mechanism for the crane shown in Figure 3;

Figure 5 is a plan view of the actuating mechanism;

Figure 6 is a sectional view taken along the line VI—VI of Figure 5; and

Figure 7 is a diagrammatical plan view of the carrier in engagement with the transfer mechanism.

Referring to Figures 1 and 2, a rolling mill 2 may be provided with a roll-out table 4 for supplying hot rods, shapes or billets to a broadside transfer mechanism 5 that in turn delivers them to a metal working machine 6.

The broadside transfer mechanism 5 may be of any desired type, although for the purpose of the present invention a mechanical hotbed or cooling table is illustrated. The transfer mechanism 5 is provided with shuffle bars 7. It is to be understood that skids and chains, or any other type of conveying mechanism, may be substituted for the mechanical hotbed without departing from the spirit of the invention. The metal working machine 6 may be of any type, although illustrated in the present invention as a shear.

Auxiliary metal working machines 8 are provided in spaced relation and physically separated from the transfer mechanism 5. The machines 8 are provided with run-out tables 9.

For conveying material from the broadside transfer mechanism 5 to the machines 8, a crane 10 is provided. The crane 10 is equipped with fingers 11 that mesh between the ends of the shuffle bars 7 for receiving material from the transfer mechanism 5 while the latter is in motion, raising the material and carrying it over the machine 6 for delivery to any one of the machines 8. With this construction the run-out table 4, the broadside transfer mechanism 5, and the machine 6 may be run continuously. If the output of the run-off table 4 exceeds the capacity of the machine 6, the excess material is transferred to any one of the machines 8, thereby preventing the slowing up or shutting down of the rolls and run-out table 4.

Referring to Figures 3 to 6, inclusive, fingers 11 are rigidly attached to a beam 12 extending longitudinally of the mill and of a length corresponding to the length of the rods or billets delivered to the transfer mechanism. The beam 12 is pivotally supported by a plurality of adjustable rods 13 attached to the ends of bell cranks 14. The bell cranks 14 are supported on shafts 15 carried by the frame work 16 of the crane 10. The other ends of the bell cranks 14 are secured to pull rods 17 extending longitudinally of the mill and in parallelism to the beam 12. The pull rods 17 are actuated by a crank 18 having a plurality of crank arms 19 one of which is connected to each of the pull rods 17.

Disposition of the bell cranks 14 is such that upon the turning of the crank 18 the pull rods are moved longitudinally of the beam 12 for raising or lowering it and the attached fingers 11. In the present form of our invention the beam 12 is illustrated as being lowered when the pull rods 17 are in their projected positions and the beam is raised when the pull rods are in their retracted positions. With reference to the crank 18, the pull rods are in their projected position when the crank arms 19 are disposed in substantially a horizontal plane, as shown in Figure 6, and are in their retracted positions when the crank arms 19 are in substantially a vertical plane.

Referring to Figures 4 and 6, guides 20 are provided for keeping the beam 12 in alignment with the frame 16 during their relative movement. The guides 20 each comprises a plurality of angle irons 21 that are secured to the frame 16 by braces 22. Posts 24 mounted on the beam 12 extend upwardly between the angle irons 21 and are guided therebetween as the beam 12 is raised and lowered.

The crank 18 is actuated by a motor 25 and a gear member 26 carried by the frame 16 on the crane 10. As the motor 25 is rotated forwardly and backwardly, the crank arms 19 move over from horizontally to vertically aligned positions thereby retracting and projecting the pull rods 17 to raise and lower the beam 12. The crane 10 is supported by wheels 27 movable along horizontally extending flanges of channel irons 28 mounted on the walls of a building. For moving the crane 10 between the different machines 6 and 8, a motor 29 is mounted on the walls of the building for driivng a shaft 30 extending longitudinally thereof. It is to be understood that the motor 29 may be mounted on the crane 10, if desired. The shaft 30 is provided with pulleys 31 cooperating with pulleys 32 mounted on the opposite wall of the building for receiving cables 34, the ends of which are attached to eye-bolts 35 on the crane 10. Upon energization of the motor 29, the shaft 30 drives the pulleys 31 and 32 for moving the crane 10 along the channel irons 28. The motor 29 may be electrically controlled either from an operator stationed somewhere in the mill or from an operator stationed in the crane 10, as desired.

In the operation of the rolling mill, rods or billets are received by the broadside transfer mechanism 5 from the run-off table 4 and move in the well-known manner to the ends of the shuffle bars 7. Under normal operating conditions the rods or billets pass from the ends of the shuffle bars 7 to the machine 6. However, if the amount of material supplied to the transfer mechanism 5 exceeds the capacity of the machine 6, the material accumulates on the transfer mechanism.

Heretofore when the accumulation became too large, it has been necessary to reduce the speed of the run-off table 4 and the associated rolls thereby diminishing the capacity of the mill. By providing the crane 10, it is possible to transfer the excess material from the transfer mechanism 5 to any one of the auxiliary machines 8 and their tables 9, as is shown in the dotted line positions of the crane 10 in Figure 1. This is accomplished by moving the crane 10 crosswise of the mill and lowering the ends of the fingers into engagement with the shuffle bars 7 as is shown in Figure 7. After receiving a desired amount of material, the beam 12 is raised to clear the transfer mechanism 5 and the machines 6 and 8 and is then moved crosswise of the mill to deposit the material upon any desired machine 8. When opposite the desired machine 8, the fingers 11 are again lowered to deliver the material thereto.

By providing the auxiliary metal working machines and the conveyor, it is possible to secure continuous and efficient operation of the mill by transferring any excess material to the auxiliary machines. This operation eliminates the necessity of slowing down or stopping the rolls and run-off table while the metal working machine is consuming the accumulated excess of material. The construction of the conveyor is characterized by a beam having material receiving means thereon. The beam is raised and lowered by a plurality of bell cranks actuated by pull rods connected to a common crank. The crank is actuated by a motor. The position of the conveyor crosswise of the mill is controlled by a motor actuated system or cables and pulleys that may be controlled at any point in the building or from the conveyor, as desired.

While we have shown and described the present preferred embodiment of our invention, it is to be understood that various changes may be made without departing from the spirit of the invention or the scope of the appended claims.

We claim:

1. The herein described method of operating a metal rolling mill which comprises delivering rolled elements to a cooling table, moving said rolled elements broadside on said cooling table, removing certain of said rolled elements from said cooling table by elevating same thereabove during broadside movement of said rolled elements and continuing the broadside movement of said rolled elements in a plane above said cooling table and above other rolled elements to be fed to a metal working machine, and delivering the elevated rolled elements to a second metal working machine.

2. The herein described method of operating a metal rolling mill which comprises delivering rolled elements to a cooling table, moving said rolled elements broadside on said cooling table, removing certain of said rolled elements from said cooling table by elevating same thereabove during broadside movement of said rolled elements and continuing the broadside movement of said rolled elements in a plane above said cooling table and above other rolled elements traveling toward a metal working machine, and delivering the elevated rolled elements to a second metal working machine.

3. The herein described method of operating a metal rolling mill which comprises delivering rolled elements to a cooling table, moving said rolled elements broadside on said cooling table, causing certain of said rolled elements to accumulate on said cooling table while delivery of rolled elements to said cooling table is continued, removing said accumulated rolled elements from said cooling table by elevating same thereabove during broadside movement of said rolled elements and continuing the broadside movement of said elevated rolled elements in a plane above said cooling table and above other rolled elements to be fed to a metal working machine, and delivering the elevated rolled elements to a second metal working machine.

4. In a mill, a delivery mechanism, a cooling table arranged to receive material from said delivery mechanism and providing means for transferring said material broadside, a metal working machine to which material from said cooling table may be delivered directly, conveying mechanism cooperating with said cooling table and arranged to remove material therefrom during its broadside movement by elevating said material above said cooling table and continuing its broadside movement into a position to feed into a supplemental metal working machine, and a supplemental metal working machine adapted to receive material from said conveying mechanism without interrupting the delivery of material from the cooling table to the first mentioned metal working machine.

5. In a mill, a delivery mechanism, a cooling table arranged to receive material from said delivery mechanism and providing means for transferring said material broadside, a metal working machine to which material from said cooling table may be delivered directly, conveying mechanism comprising an overhead crane cooperating with said cooling table and arranged to remove material therefrom during its broadside movement by elevating said material above said cooling table and continuing its broadside movement into a position to feed into a supplemental metal working machine, and a supplemental metal working machine adapted to receive material from said conveying mechanism without interrupting the delivery of material from the cooling table to the first mentioned metal working machine.

In testimony whereof we have hereunto set our hands.

THOMAS R. AKIN.
LAFE YOUNG.
FLORENCE C. BIGGERT, Jr.